(12) United States Patent
Driscoll et al.

(10) Patent No.: US 8,250,857 B2
(45) Date of Patent: Aug. 28, 2012

(54) EXHAUST AFTERTREATMENT SYSTEM

(75) Inventors: James Joshua Driscoll, Dunlap, IL (US); Praveen S. Chavannavar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 340 days.

(21) Appl. No.: 12/611,335

(22) Filed: Nov. 3, 2009

(65) Prior Publication Data

US 2011/0099996 A1    May 5, 2011

(51) Int. Cl.
*F01N 3/36* (2006.01)
(52) U.S. Cl. ............ 60/286; 60/274; 60/295; 60/301; 60/303
(58) Field of Classification Search .......... 60/274, 60/286, 295, 301, 303
See application file for complete search history.

(56) References Cited

U.S. PATENT DOCUMENTS

| | | | |
|---|---|---|---|
| 2,612,745 A | 10/1952 | Vecchio | |
| 4,300,924 A | 11/1981 | Coyle | |
| 5,348,715 A | 9/1994 | Chang | |
| 5,453,107 A | 9/1995 | Liu | |
| 6,363,771 B1 * | 4/2002 | Liang et al. | 73/23.31 |
| 6,402,816 B1 | 6/2002 | Trivett et al. | |
| 7,056,367 B2 | 6/2006 | Trivett | |
| 7,273,595 B2 | 9/2007 | Spokoyny | |
| 7,416,172 B2 | 8/2008 | Duesel, Jr. et al. | |
| 2001/0014297 A1 | 8/2001 | Neufert | |
| 2008/0028751 A1 * | 2/2008 | Stroia et al. | 60/286 |
| 2008/0038180 A1 * | 2/2008 | Spokoyny | 423/358 |
| 2008/0307967 A1 | 12/2008 | Coates et al. | |
| 2008/0314027 A1 * | 12/2008 | Barber et al. | 60/286 |
| 2009/0120079 A1 * | 5/2009 | Buckberry et al. | 60/303 |
| 2009/0145117 A1 | 6/2009 | Doring et al. | |
| 2011/0005206 A1 * | 1/2011 | Li et al. | 60/286 |

FOREIGN PATENT DOCUMENTS

GB    463770    4/1937

* cited by examiner

*Primary Examiner* — Kenneth Bomberg
*Assistant Examiner* — Jorge Leon, Jr.
(74) *Attorney, Agent, or Firm* — Mark R. Hull

(57) ABSTRACT

An exhaust aftertreatment system for an engine is disclosed. The exhaust aftertreatment system including a first exhaust passage, an SCR catalyst disposed in the first exhaust passage, a second exhaust passage parallel with the first exhaust passage and fluidly coupled to the first exhaust passage upstream of the SCR catalyst and a container disposed in the second exhaust passage, the container configured to hold a volume of urea and to direct exhaust from the second exhaust passage through the volume of urea in the container.

21 Claims, 1 Drawing Sheet

EXHAUST AFTERTREATMENT SYSTEM

TECHNICAL FIELD

The present disclosure relates to exhaust aftertreatment systems for removing or reducing undesirable emissions from the exhaust of fossil fuel powered systems.

BACKGROUND

Exhaust aftertreatment systems are used to remove undesirable emissions from the exhaust of fossil fuel powered systems (e.g. diesel engine, gas engines, gas turbines), which may be used to drive, for example, generators, commercial vehicles, machines, ships, and locomotives. Exhaust aftertreatment systems may include a variety of emissions treatment technologies, such as diesel oxidation catalysts (DOCs), diesel particulate filters (DPFs), selective catalytic reduction catalysts (SCRs), lean NOx traps (LNTs) or other devices used to treat the exhaust.

Selective Catalytic Reduction (SCR) systems provide a method for removing nitrogen oxide (NOx) emissions from fossil fuel powered systems. During SCR, a catalyst facilitates a reaction between a reductant and NOx to produce water and nitrogen gas, thereby removing NOx from the exhaust gas. Generally, the reductant is mixed with the exhaust upstream of the SCR catalyst.

A commonly used reductant in the SCR process is aqueous urea (i.e. a water-urea mixture) because, unlike ammonia, urea is non-toxic and easy to handle, while also being easy to transport, inexpensive and commonly available. Typically, to facilitate SCR, aqueous urea is injected into the exhaust stream of an engine prior to an SCR catalyst. The heat of the exhaust causes the aqueous urea to evaporate and decompose forming ammonia, which will react to reduce the NOx. Liquid urea injection systems, however, introduce added complexity and cost into the process. Thus, alternative methods of utilizing aqueous urea to introduce ammonia into an exhaust system have been sought.

U.S. Pat. No. 7,273,595, by Spokoyny. (hereinafter the '595 patent), discloses such a system. The '595 application discloses passing aqueous urea through or in the vicinity of an ultrasonic transducer to produce a powerful sonic field in the urea. The sonic field causes acoustic cavitation, which in turn causes ammonia and carbon dioxide to be generated and released from the solution. A blower is then used to blow the gaseous ammonia byproduct, along with dilution air, to a location for introduction into an exhaust stream.

While the system disclosed in the '595 application may be suitable to produce ammonia from urea without the need for a liquid injection system, the system and method may be unsuitable for applications that require more than small amounts of urea. Furthermore, the disclosed system introduces additional cost and complexity by requiring the addition of an ultrasonic transducer for generation of gaseous ammonia and a blower for transport of the gaseous ammonia.

SUMMARY

In one aspect, the present disclosure provides an exhaust aftertreatment system for an engine. The exhaust aftertreatment system includes a first exhaust passage, an SCR catalyst disposed in the first exhaust passage, a second exhaust passage parallel with the first exhaust passage and fluidly coupled to the first exhaust passage upstream of the SCR catalyst and a container disposed in the second exhaust passage, the container configured to hold a volume of urea and to direct exhaust from the second exhaust passage through the volume of urea in the container.

In another aspect, the present disclosure provides a method of treating the exhaust of an engine. The method including providing a volume of aqueous urea solution within a container, passing a first exhaust stream from the engine through the container to create a gas mixture containing exhaust and ammonia, directing the mixture into a second exhaust stream from the engine, and directing the combined exhaust to an SCR catalyst Other features and aspects of this disclosure will be apparent from the following description and the accompanying drawings.

BRIEF DESCRIPTION OF THE DRAWINGS

In the accompanying drawing, which is incorporated in and constitutes a part of this specification, an exemplary embodiment of the disclosure is illustrated, which, together with the written description, serve to explain the principles of the disclosed system.

DETAILED DESCRIPTION

Figure 1:
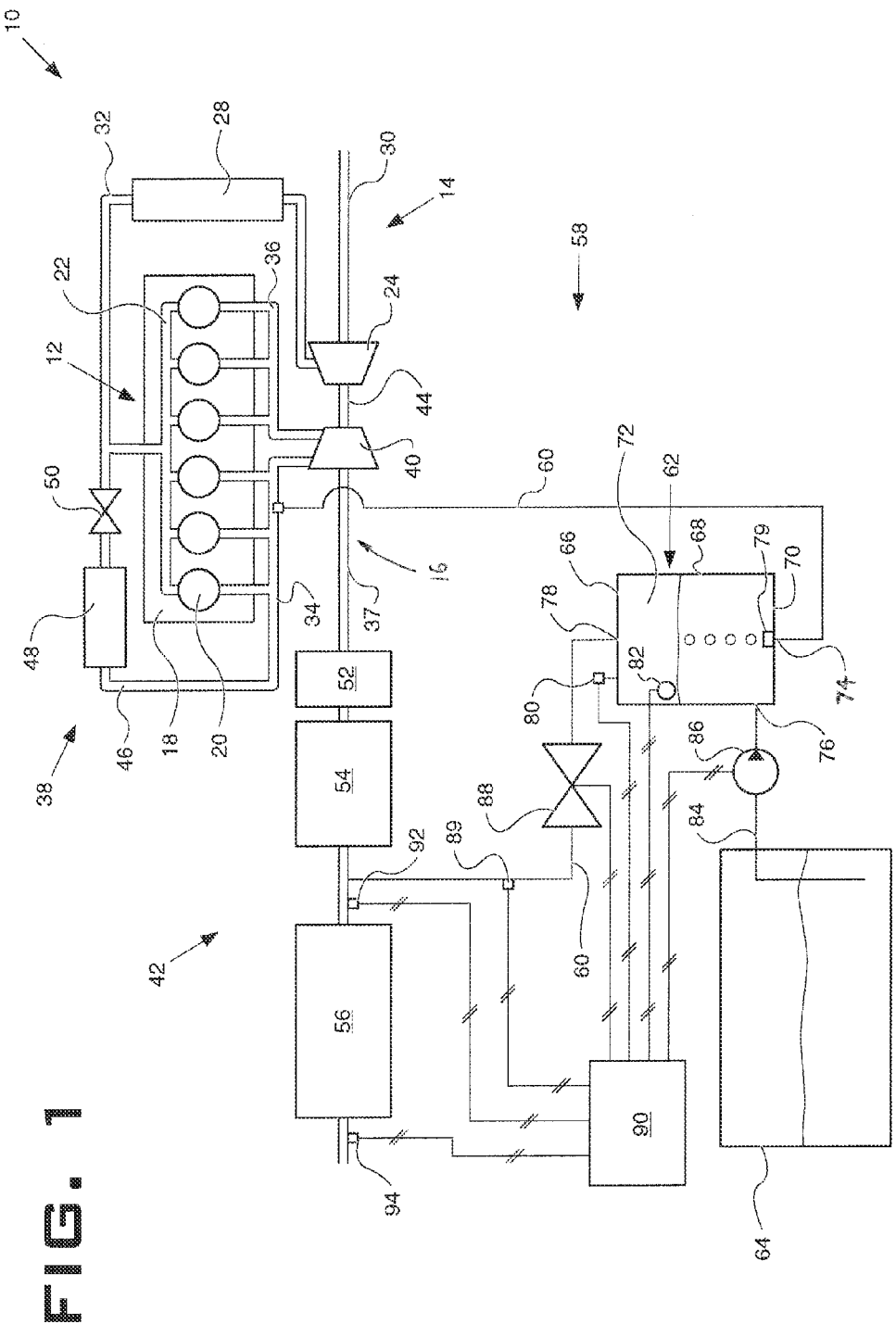
FIG. 1 is a schematic view of an exemplary exhaust after treatment system according to the present disclosure.

FIG. 1 illustrates a power system 10 having an engine 12, an air induction system 14, and an exhaust system 16. The engine 12 may include features not shown, such as fuel systems, air systems, cooling systems, peripheries, drivetrain components, turbochargers, etc. The engine 12 may be any type of engine (internal combustion, turbine, gas, diesel, gaseous fuel, natural gas, propane, etc.), may be of any size, with any number of cylinders, and in any configuration ("V," in-line, radial, etc.). The engine 12 may be used to power any machine or other device, including locomotive applications, on-highway trucks or vehicles, off-highway trucks or machines, earth moving equipment, generators, aerospace applications, marine applications, pumps, stationary equipment, or other engine powered applications. For the purposes of this disclosure, the engine 12 is depicted and described as a four-stroke diesel engine. The engine 12 may include an engine block 18 that at least partially defines a plurality of cylinders 20. A piston (not shown) may be slidably disposed within each of the plurality of cylinders 20 to reciprocate between a top-dead-center position and a bottom-dead-center position, and a cylinder head (not shown) may be associated with each of the plurality of cylinders 20. In the illustrated embodiment, the engine 12 includes six cylinders 20. It is contemplated, however, that the engine 12 may include a greater or lesser number of cylinders 20 and that the cylinders 20 may be disposed in an "in-line" configuration, a "V" configuration, or in any other suitable configuration.

The air induction system 14 may include components configured to introduce charged air into the engine 12. For example, the air induction system 14 may include an intake manifold 22 in communication with the cylinders 20, a compressor 24 and an air cooler 28. The compressor 24 may embody a fixed geometry compressor, a variable geometry compressor, or any other type of compressor configured to receive air from a fluid passageway 30 upstream of the compressor 24 and compress the air to an elevated pressure level before it enters the engine 12.

The air cooler 28 may embody an air-to-air heat exchanger, an air-to-liquid heat exchanger, or a combination of both, and be configured to facilitate the transfer of thermal energy to or from the compressed air directed into the engine 12. The air cooler 28 may be disposed within a fluid passageway 32 between the engine 12 and the compressor 24.

The exhaust system 16 may include components configured to direct exhaust from the engine 12 to the atmosphere. Specifically, the exhaust system 16 may include a first exhaust manifold 34 in fluid communication with three of the cylinders 20 and a second exhaust manifold 36 in fluid communication with the other three cylinders 20. In other embodiments, the first exhaust manifold 34 and the second exhaust manifold 36 may be in fluid communication with more or less than three cylinders or a single exhaust manifold in fluid communication with all of the cylinders may be used.

The exhaust system 16 may also include a first exhaust passage 37, an exhaust gas recirculation (EGR) circuit 38 fluidly communicating the exhaust system 16 with the air induction system 14, a turbine 40 associated with the compressor 24, and an exhaust aftertreatment system 42

The first exhaust manifold 34 and the second exhaust manifold 36 may fluidly connect the engine 12 to the turbine 40. The turbine 40 may be configured to drive the compressor 24. For example, turbine 40 may be directly and mechanically connected to the compressor 24 by a rotatable shaft 44 to form a turbocharger.

The first exhaust manifold 34 may also fluidly connect the engine 12 to the EGR circuit 38. The EGR circuit 38 may include components that cooperate to redirect a portion of the exhaust produced by the engine 12 from the first exhaust manifold 34 to the air induction system 14. Specifically, the EGR circuit 38 may include a fluid passageway 46, an EGR cooler 48 and a recirculation control valve 50. The fluid passageway 46 may be fluidly connected to the exhaust system 16 upstream of turbine 40 and fluidly connected to the air induction system 14 downstream of the air cooler 28.

The recirculation control valve 50 may be disposed within the fluid passageway 46 downstream of the EGR cooler 48 to control the flow of exhaust through the EGR circuit 38. the recirculation control valve 50 may be any type of valve known in the art such as, for example, a butterfly valve, a diaphragm valve, a gate valve, a ball valve, a poppet valve, or a globe valve. In addition, the recirculation control valve 50 may be solenoid-actuated, hydraulically-actuated, pneumatically-actuated or actuated in any other manner to selectively restrict or completely block the flow of exhaust through the fluid passageway 46.

The EGR cooler 48 may be configured to cool exhaust flowing through EGR circuit 38. EGR cooler 48 may include a liquid-to-air heat exchanger, an air-to-air heat exchanger, or any other type of heat exchanger known in the art for cooling an exhaust flow.

The exhaust aftertreatment system 42 is configured to remove undesirable emissions from the exhaust of the engine 12. The exhaust aftertreatment system 42 may include a variety of emissions treatment technology, including, but not limited to, regeneration devices, heat sources, oxidation catalysts, diesel oxidation catalysts (DOCs), diesel particulate filters (DPFs), selective catalytic reduction catalysts (SCRs), lean NOx traps (LNTs), mufflers, or other devices needed to treat the exhaust exiting the engine 12. The exhaust aftertreatment system 42 is illustrated as being downstream from the turbine 40. One or more components of the exhaust aftertreatment system 42, however, may be located between the engine and the turbine 40.

In the depicted embodiment, the exhaust aftertreatment system 42 includes a DOC 52, a DPF 54, and an SCR catalyst 56. In the depicted embodiment, the DOC 52, DPF 54, and the SCR catalyst 56 are disposed in the first exhaust passage 37 in series, though the order, arrangement of, and type of aftertreatment system devices may vary in other embodiments.

The DOC 52 may be configured in a variety of ways and contain catalyst materials useful in collecting, absorbing, adsorbing, and/or converting hydrocarbons, carbon monoxide, and/or oxides of nitrogen contained in the exhaust. Such catalyst materials may include, for example, aluminum, platinum, palladium, rhodium, barium, cerium, and/or alkali metals, alkaline-earth metals, rare-earth metals, or combinations thereof. The DOC(s) may include, for example, a ceramic substrate, a metallic mesh, foam, or any other porous material known in the art, and the catalyst materials may be located on, for example, a substrate of the DOC(s). The DOC(s) may, for example, assist in oxidizing one or more components of the exhaust flow, such as, for example, particulate matter, hydrocarbons, and/or carbon monoxide. The DOC(s) may also be configured to oxidize NO contained in the exhaust gas, thereby converting it to NO2. Thus, the DOC(s) may assist in achieving a desired ratio of NO to NO2 upstream of the SCR(s).

The DPF 54 may be configured in a variety of ways. Any structure capable of removing particulate matter from the exhaust of the engine 12 may be used. For example, the DPF 54 may include a wall-flow ceramic substrate having a honeycomb cross-section constructed of cordierite, silicon carbide, or other suitable material to remove the particulate matter.

The SCR catalyst(s) 56 may be configured in a variety of ways. The SCR catalyst(s) 56 may be any suitable SCR catalyst, such as for example, a vanadium and titanium-type, a platinum-type, or a zeolite-type SCR catalyst, and may include a metallic or ceramic honeycomb flow-through substrate or other structure containing one or more of these metals and configured to assist in reducing NOx. The SCR catalyst(s) 56 may have an optimum or peak NOx conversion rate when the ratio of NO to NO2 entering the SCR catalyst(s) 56 is approximately one to one.

A reductant supply system 58 may be associated with the exhaust aftertreatment system 42 to introduce a reductant into the exhaust system 16. The reductant supply system 58 may include a second exhaust passage 60 parallel with the first exhaust passage 37, a container 62 disposed in the second exhaust passage 60, and a urea source 64 in fluid communication with the container 62.

The container 62 may be configured in a variety of ways. Any container configured to hold a volume of urea, receive exhaust and flow the exhaust through the volume of urea such that the urea evaporates, and direct the gaseous byproduct out of the container may be used. Thus, any suitable shape, size, and construction of the container 62 may be used. The container 62 may be made of a variety of materials suitable for holding urea and withstanding the heat from engine exhaust. In the depicted embodiment, the container 62 is configured as an evaporator that includes a closed structure having a top wall 66, a side wall 68, and a bottom wall 70 that define a chamber 72. The chamber 72 is configured to hold a volume of urea.

The container 62 includes an exhaust inlet 74, a reductant inlet 76, and a gas outlet 78. The exhaust inlet 74 is configured to direct exhaust through the urea held within the container 62. For example, the exhaust inlet 74 may be positioned along the bottom wall 70 or adjacent the bottom wall 70 such that the exhaust inlet 74 is below the surface of the urea within the container 62. The exhaust inlet 74 may include structure 79 configured to bubble the exhaust through the urea in one or more locations within the container 62. In addition, the exhaust inlet 74 may include structure that increases the surface area of urea exposed to the heat from the exhaust and thus increase heating of the urea solution. For example, a helical tube, passage or other structure may be disposed below the surface of the urea. Exhaust may be routed through the tube or passage before being bubbled through the urea mixture.

The gas outlet 78 is configured to allow the gaseous mixture of exhaust gas and evaporated urea to exit the container 62. For example, the gas outlet 78 may be positioned above the level of urea in the chamber 72, such as along the top wall 66 or adjacent to the top wall 66.

One or more sensors may be associated with the container 62. For example, a pressure sensor 80 may be associated with the container 62 to provide a signal indicative of the pressure inside the chamber 72. In addition, a level sensor 82 may be associated with the container 62 to provide a signal indicative of the level of urea in the container 62.

The reductant inlet 76 is configured to direct urea received from the urea source 64 into the chamber 72. The urea source 64 may be a tank, vessel, absorbing material, or other device capable of storing and releasing the urea. The urea source 64 may be in fluid communication with the container 62 via a fluid conduit 84. The fluid conduit 84 may be connected to the reductant inlet 76 and a pumping device 86 may be disposed in the fluid conduit 84 and configured to deliver urea to the container 62. The pumping device 86 may be any suitable device capable of delivering urea from the urea source 64 to the container 62. For example, the pumping device 86 may be a metering pump such as, for example, a diaphragm pump.

The second exhaust passage 60 fluidly connects the first exhaust manifold 34 to the container 62 and fluidly connects the container 62 to the first exhaust passage 37 upstream of the SCR catalyst 56. The second exhaust passage, however, may be connected to the second exhaust manifold 36 in other embodiments. A control valve 88 may be positioned in the second exhaust passage 60 downstream of the container 62. The control valve 88 is configured to control the flow of gas from the container 62 to the second exhaust passage 60. An ammonia detecting sensor 89 may also be positioned in the second exhaust passage 60 downstream of the container 62. The ammonia detecting sensor 89 is configured to generate a signal indicative of the amount of ammonia in the second exhaust passage 60.

The power system 10 may also include one or more controllers 90 configured to control and monitor the operation of the engine 12 and the exhaust system 16. The controller(s) 90 may be any type of programmable logic controller(s) known in the art for automating machine processes such as, for example, an engine control unit (ECU). The power system 10 may have a single controller that controls and monitors both the engine 12 and the exhaust system 16, or multiple controllers that control and monitor various portions of the power system 10. For example, the power system 10 may have a first controller that is in communication with the engine 12 to control and monitor the operation of the engine and may have a second controller that is in communication with the exhaust system 16 to control and monitor the operation of components in the exhaust system 16. For example, the amount of urea in the container 62 and the pressure within the chamber 72 may be monitored. The first and second controllers may also be in communication with each other.

In the depicted embodiment, the controller(s) 90 may be electrically connected to the pumping device 86 and to the control valve 88 to control the operation of each. The controller(s) 90 may also be in communication with various sensors associated with the exhaust system 16. For example, the controller(s) 90 may be electrically connected to the pressure sensor 80 and the level sensor 82 to receive signals indicative of the pressure in the container 62 and the level of urea in the container 62, respectively. In addition, the controller(s) 90 may also be electrically connected to a temperature sensor 92 disposed in the exhaust system 16, to a NOx sensor 94 disposed downstream of the SCR catalyst 56, and to the ammonia detecting sensor 89. The controller(s) 90 may also monitor and control other various portions of the power system 10, such as controlling the recirculation control valve 50, monitoring and controlling EGR temperature, monitoring and controlling intake air temperature, etc.

INDUSTRIAL APPLICABILITY

The disclosed exhaust aftertreatment system 42 may be used to reduce undesirable exhaust emissions from a power system 10 in a variety of applications, such as but not limited to, locomotive applications, on-highway trucks or vehicles, off-highway trucks or machines, earth moving equipment, generators, aerospace applications, marine applications, pumps, stationary equipment, or other engine powered applications. The disclosed exhaust aftertreatment system 42 may provide ammonia from aqueous urea to facilitate SCR without the need for a liquid injection system. The operation of the exhaust aftertreatment system will now be described.

Atmospheric air may be drawn into the engine 12, mixed with fuel, and then combusted to produce mechanical work. Exhaust from the combustion of the air-fuel mixture may contain gaseous compounds and solid particulate matter. The exhaust may be directed from engine 12 through the first exhaust manifold 34 and the second exhaust manifold 36, through the turbine 40, and then through the exhaust aftertreatment system 42 via the first exhaust passage 37.

In the exhaust aftertreatment system, the DOC 52 converts carbon monoxide to carbon dioxide, converts hydrocarbons to carbon dioxide and water, and converts nitric oxide to nitrogen dioxide while the DPF filters out particular matter. Prior to exhaust entering the SCR catalyst, ammonia from the reductant supply system 58 is introduced into the exhaust.

A portion of exhaust from the first exhaust manifold 34 may be routed back to the induction air system via the EGR circuit 38. In addition, a portion of the exhaust from the first exhaust manifold 34 may be routed through the second exhaust passage 60 to the container 62 in order to produce ammonia for delivery to the SCR catalyst 56. For example, the controller 90 may monitor the temperature of the exhaust gas entering the SCR catalyst 56 based on the signals from the temperature sensor 92. When the exhaust temperature exceeds a threshold temperature, for example, about 180° C. and above, at which selective catalytic reduction may occur, the controller(s) 90 may control the control valve 88 to initiate the delivery of gaseous ammonia to the first exhaust passage 37.

To deliver gaseous ammonia to the first exhaust passage 37, the controller 90 may actuate the control valve 88 to create a sufficient pressure differential to induce flow through the second exhaust passage 60 and container 62. Under operating conditions, the exhaust pressure in the first exhaust manifold 34 is sufficient to overcome the pressure from the amount of urea in the container 62 and the exhaust pressure in the first exhaust passage 37, thus the control valve 88 can be adjusted to control the flow of exhaust through the container 62.

The container 62 includes a volume of urea, and the exhaust from the second exhaust passage 60 enters the container 62 and flows through the volume of urea. The amount of urea in the container 62 is controlled to a predetermined level and can be accomplished in a variety of ways. For example, the controller(s) 90 may include predetermined calibrated maps of the amount of exhaust flow needed as a function of the exhaust temperature and the amount of ammonia delivery required. In addition, the ammonia detecting sensor 89 may send a signal to the controller 90 indicative of the amount of ammonia in the second exhaust passage 60. The controller 90 may then compare the amount of ammonia to a desired amount and control the pumping device 86 to add additional urea to the container 62 if needed. In addition, or alternately, the level sensor 82 may send a signal to the controller 90 indicative of the level of urea in the container 62. The controller 90 may then compare the level in the container 62 to a predetermined desired level and control the pumping device 86 to add additional urea to the container 62 if the level is below the desired level. Furthermore, the level of urea in the container 62 may be controlled based on the pressure in the container 62. For example, the pressure sensor 80 may send a signal to the controller indicative of the pressure in the container 62. The controller 90 may then control the pumping device 86 to adjust the amount of urea in the container 62.

As the exhaust flows through the aqueous urea in the container 62, the heat from the exhaust causes the aqueous urea to evaporate. The gaseous byproduct mixes with the exhaust in the chamber 72 and decomposes into ammonia. The mixture of the gaseous ammonia and exhaust may then flow from the container 62, through the second exhaust passage 60 and into the first exhaust passage upstream of the SCR catalyst 56. Thus, a portion of the exhaust from the engine 12 may be used as a heat source to evaporate aqueous urea in a container and carry the gaseous ammonia byproduct to an exhaust stream to be treated.

Once merged with exhaust in the first exhaust passage 37, the combined exhaust flows through the SCR catalyst where nitric oxide is converted to nitrogen and water. During the process, the NOx sensor 94 may send a signal to the controller(s) 90 and the controller(s) may control the control valve 88 to adjust the amount of gaseous ammonia being produced and being delivered to the first exhaust passage 37.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. An exhaust aftertreatment system for an engine, comprising:
    a first exhaust passage defining a first exhaust stream from the engine;
    an SCR catalyst disposed in the first exhaust passage;
    a second exhaust passage defining a second exhaust stream from the engine, the second exhaust passage being parallel with the first exhaust passage and having a downstream end fluidly coupled to the first exhaust passage upstream of the SCR catalyst; and
    a container disposed in the second exhaust passage and defining a chamber configured to hold a volume of urea, the chamber fluidly communicating with the second exhaust passage to receive the second exhaust stream from the engine, wherein the chamber is configured to mix the urea and second exhaust stream to form a gas mixture containing exhaust and ammonia.

2. The exhaust aftertreatment system of claim 1, wherein the container is configured to bubble the second exhaust stream through the volume of urea.

3. The exhaust aftertreatment system of claim 1 wherein the container further comprises an exhaust inlet configured to be below the surface of the urea in the container.

4. The exhaust aftertreatment system of claim 1 wherein the container further comprises a top surface and a gas outlet positioned in or proximate to the top surface.

5. The exhaust aftertreatment system of claim 1 further comprising a control valve disposed in the second exhaust passage and a controller configured to regulate the second exhaust stream through the second exhaust passage by controlling operation of the control valve.

6. The exhaust aftertreatment system of claim 5 further comprising a pressure sensor configured to send a signal indicative of a pressure in the container, wherein the controller is configured to control the control valve in response to the signal from the pressure sensor.

7. The exhaust aftertreatment system of claim 5 further comprising a NOx sensor configured to send a signal indicative of an amount of NOx in the exhaust exiting the SCR catalyst, wherein the controller is configured to control the control valve in response to the signal from the NOx sensor.

8. The exhaust aftertreatment system of claim 5 further comprising a temperature sensor configured to send a signal indicative of an exhaust temperature entering the SCR catalyst, wherein the controller is configured to close the control valve when the exhaust temperature is below a predetermined temperature threshold.

9. A method of treating the exhaust of an engine, comprising:
    providing a volume of aqueous urea solution within a container;
    passing a first exhaust stream from the engine through the container to create a gas mixture containing exhaust and ammonia;
    directing the mixture into a second exhaust stream from the engine; and
    directing the combined exhaust to an SCR catalyst.

10. The method of claim 9 further comprising the step of controlling the volume of aqueous urea solution within the container to a predetermined amount.

11. The method of claim 9 wherein the step of passing a first exhaust stream from the engine through the container further comprises controlling a flow of the first exhaust stream in response to a pressure within the container.

12. The method of claim 9 wherein the step of passing a first exhaust stream from the engine through the container further comprises bubbling the first exhaust stream through the aqueous urea solution.

13. A power system, comprising:
    an engine;
    an exhaust manifold configured to receive exhaust from the engine;
    an exhaust aftertreatment system configured to receive exhaust from the exhaust manifold, comprising:
        a first exhaust passage defining a first exhaust stream from the engine;
        an SCR catalyst disposed in the first exhaust passage;
        a second exhaust passage defining a second exhaust stream from the engine, the second exhaust passage being parallel with the first exhaust passage and having a downstream end fluidly coupled to the first exhaust passage upstream of the SCR catalyst; and
        a container disposed in the second exhaust passage and defining a chamber configured to hold a volume of urea, the chamber fluidly communicating with the second exhaust passage to receive the second exhaust stream from the engine, wherein the chamber is configured to mix the urea and second exhaust stream to form a gas mixture containing exhaust and ammonia.

14. The power system of claim 13 further comprising a turbine configured to receive exhaust from the exhaust manifold, wherein the second exhaust passage is configured to receive exhaust from the exhaust manifold at a location upstream of the turbine.

15. The power system of claim 13 wherein the container is configured to bubble the second exhaust stream through the volume of urea.

16. The power system of claim 13 wherein the container further comprises an exhaust inlet configured to be below the surface of the urea in the container.

17. The power system of claim 13 wherein the container further comprises a top surface and a gas outlet positioned in or proximate to the top surface.

18. The power system of claim 13 further comprising a control valve disposed in the second exhaust passage and a controller configured to regulate the second exhaust stream through the second exhaust passage by controlling operation of the control valve.

19. The power system of claim 18 further comprising a pressure sensor configured to send a signal indicative of a pressure in the container, wherein the controller is configured to control the control valve in response to the signal from the pressure sensor.

20. The power system of claim 18 further comprising a NOx sensor configured to send a signal indicative of an amount of NOx in the exhaust exiting the SCR catalyst, wherein the controller is configured to control the control valve in response to the signal from the NOx sensor.

21. The power system of claim 18 further comprising a temperature sensor configured to send a signal indicative of a temperature of exhaust entering the SCR catalyst, wherein the controller is configured to close the control valve when the exhaust temperature is below a predetermined temperature threshold.

* * * * *